United States Patent
Barbagli

(10) Patent No.: US 10,969,062 B2
(45) Date of Patent: Apr. 6, 2021

(54) MONITORING SYSTEM FOR A SECTION OR A COMPONENT OF A PIPELINE FOR THE TRANSPORT OF HYDROCARBONS IN A HAZARD SITE

(71) Applicant: Mauro Odori, Castelfranco Piandisco (IT)

(72) Inventor: Serena Barbagli, Castelfranco Piandisco (IT)

(73) Assignee: Mauro Odori

( * ) Notice: Subject to any disclaimer, the term of this patent is extended or adjusted under 35 U.S.C. 154(b) by 0 days.

(21) Appl. No.: 16/493,535

(22) PCT Filed: Mar. 13, 2018

(86) PCT No.: PCT/IB2018/051669
§ 371 (c)(1),
(2) Date: Sep. 12, 2019

(87) PCT Pub. No.: WO2018/167668
PCT Pub. Date: Sep. 20, 2018

(65) Prior Publication Data
US 2020/0158292 A1    May 21, 2020

(30) Foreign Application Priority Data
Mar. 13, 2017   (IT) .................. 102017000027345

(51) Int. Cl.
*F17D 5/06*    (2006.01)
*F17D 5/00*    (2006.01)
(Continued)

(52) U.S. Cl.
CPC ............. *F17D 5/06* (2013.01); *F17D 5/005* (2013.01); *G01M 3/243* (2013.01);
(Continued)

(58) Field of Classification Search
CPC ... F17D 5/00; F17D 5/005; F17D 5/02; F17D 5/04; F17D 5/06; F16L 2101/00;
(Continued)

(56) References Cited

U.S. PATENT DOCUMENTS 5,376,927 A * 12/1994 Kidd .................. G01M 3/2892
  340/514
8,172,434 B1 * 5/2012 Olsson .................... B63B 45/00
  362/346

(Continued)

FOREIGN PATENT DOCUMENTS

| CN | 202256048 U | 5/2012 |
| EP | 1 832 798 A1 | 9/2007 |
| FR | 2 864 202 A1 | 6/2005 |

OTHER PUBLICATIONS

International Search Report, Application No. PCT/IB2018/051669, dated Mar. 7, 2019, 3 pages.
(Continued)

Primary Examiner — Van T Trieu
(74) Attorney, Agent, or Firm — Ware, Fressola, Maguire & Barber LLP

(57) ABSTRACT

A system for monitoring a section or a component of a line for the transport of hydrocarbons, for example a methane pipeline, installed in a hazard and/or limited access site, includes: a detector for detecting deformation (102,2) of the section (1) of the line or component in their installation area; a computerized central unit (3), provided with an interface for the deformation detector and connected thereto to receive data about possible deformations; a transmitter for remote transmission of data (4), connected to the computerized central unit (3) and a remote communication line (5) to transmit the data to one or more operating central stations or remote users authorized to control the methane pipeline; a stand-alone solar electric generator (10), connected to the
(Continued)

detector, to the central unit (3) and to the transmitter for providing power needed for operation.

11 Claims, 3 Drawing Sheets

(51) Int. Cl.
  *G01M 3/24* (2006.01)
  *F17D 1/04* (2006.01)
  *F17D 3/01* (2006.01)
(52) U.S. Cl.
  CPC ............. *F16L 2201/30* (2013.01); *F17D 1/04* (2013.01); *F17D 3/01* (2013.01)
(58) Field of Classification Search
  CPC ..... F16L 2101/30; G01M 3/00; G01M 3/007; G01M 3/04; G01M 3/042; G01M 3/045; G01M 3/047; G01M 3/06; G01M 3/08; G01M 3/16; G01M 3/24; G01M 3/243; G01M 3/246
  See application file for complete search history.

(56) References Cited

U.S. PATENT DOCUMENTS

| | | |
|---|---|---|
| 2003/0079553 A1 | 5/2003 | Cain et al. |
| 2007/0041333 A1 | 2/2007 | Twitchell, Jr. |
| 2007/0284112 A1 | 12/2007 | Magne et al. |
| 2014/0028462 A1* | 1/2014 | Lawson .................... H04Q 9/00 340/870.01 |
| 2015/0010356 A1* | 1/2015 | Adler ....................... G01M 3/18 405/52 |
| 2015/0136234 A1 | 5/2015 | Zulfiquar |
| 2015/0153743 A1 | 6/2015 | Jarrell et al. |
| 2015/0159481 A1* | 6/2015 | Mebarkia ................ E21B 47/14 166/336 |

OTHER PUBLICATIONS

Bibliograhic Data including English Abstract for CN202256048U, 3 pages, May 2012.

* cited by examiner

MONITORING SYSTEM FOR A SECTION OR A COMPONENT OF A PIPELINE FOR THE TRANSPORT OF HYDROCARBONS IN A HAZARD SITE

TECHNICAL FIELD

The present invention relates to the technical field of monitoring systems, and more precisely to monitoring systems for transport lines for fluid hydrocarbons (methane pipeline or oil pipelines) or, more generally, of other fluids, such as waterworks.

In particular, the invention relates to a system for continuously monitoring a limited section, or a particular component of the above mentioned lines, installed in a site which can be crucial for the integrity of the aforesaid section or component.

BACKGROUND ART

It is known that the hydrocarbons (mainly methane and petroleum or its derivatives) are transported from the production sites to the storage sites, and then to distribution and use sites, mainly by methane or oil pipelines, transport lines made up of underground, surface or pipelines. Every line is generally divided in sections, separated by compression or pumping stations, necessary over the long distances to restore sufficient pressure and flow of the hydrocarbons. Other components are provided along the line, such as flow shut-off valves, reduction units, etc. Many of these components, especially with regard to distribution lines, are installed inside closed structures, such as cabins of limited size and often just enough to accommodate the above components, and therefore difficult to access for maintenance.

The monitoring system proposed by the invention, which finds particular but not exclusive application in the monitoring of lines for the transport of hydrocarbons, is applied without distinction either to the lines for the transport of methane or to those for the transport of liquid hydrocarbons. However, for sake of descriptive simplicity, in the following, reference will be made to the methane pipeline, considering all the remarks valid also with respect to the oil pipeline and other types of lines for the transport of hydrocarbons.

Due to their nature, the methane pipelines cross territories having very different topographical and morphological characteristics, flat or mountainous, dry or very humid, with compact soils or at risk of subsidence, strongly anthropized or deserted and difficult to access, at least in a short time.

In any case, due to the importance of the continuity of the methane supply and distribution, ensuring that each single section of the methane pipeline is always operating and in perfect working order is essential, so as to avoid interruptions in the transport and distribution of the product, excluding completely exceptional and unpredictable cases. Even in these sporadic cases, however, immediate identification of the site and type of the problem is crucial, to intervene very rapidly to solve it and restore the flow of methane.

TECHNICAL PROBLEM

In order to minimize emergency situations, methane pipeline are generally monitored by teams of specially trained maintenance technicians. However, this technique proves to be inadequate in several cases, and does not ensure sufficient control of the status of a methane pipeline, especially in some of its most critical features.

A particularly significant example is related to the sections of the methane pipeline that cross unreachable, unstable territories, subject to landslides, which are often situated in poorly anthropized and difficult to access areas, since they are far from roads or other communication channels.

In these cases it is difficult, and therefore also very expensive, to ensure a sufficiently careful and constant monitoring service.

Moreover, with the currently used monitoring techniques, it is essentially impossible to carry out an early warning action, which in many cases would prevent the occurrence of breakages in the pipes or serious malfunctions of other components of the pipeline.

For example, in areas with unstable ground and subject to landslides, a subsidence of the land on which a section of line or a component of the methane pipeline is installed can cause serious problems to the line, causing dislocations or breakages in the pipeline or in the affected component.

Landslides, or in any case significant land subsidence, are usually not completely unexpected phenomena, but are almost always anticipated by well-identified signs, such as small localized displacements of ground, depressions in the surface, formation of superficial cracks etc. These signals can occur hours or even days before the proper landslide.

In any case, if identified in time, small changes in the situation near the section of hazardous gas pipeline can allow to take protective measures, and often avoid breakages or serious damage to the pipes or components of the transport line.

Moreover, in areas particularly subject to landslips and landslides, special tubing sections are often installed in the line, which allow to mitigate the effects of small displacements of the surrounding soil and of the stresses that they create on the line. Such pipe sections are made resilient by the presence of spring sections at the ends, and possibly of particular devices called dielectric joints. These solutions allow the section of the line to contract and expand by a few centimeters in response to the aforementioned stresses. It is however clear that the effect of such special sections is limited, and cannot compensate for strong movements of the line.

OBJECTS OF THE INVENTION

It is the object of the present invention to propose a system for monitoring the hazard sections of a line for the transport of hydrocarbons, or important components thereof, which allows to provide continuous information about the situation of the line section to a information collection center.

Another object of the invention is to propose a monitoring system capable of providing early alarm information for potentially critical situations for the section or component of the monitored transport line.

SUMMARY OF THE INVENTION

These and other objects are wholly obtained by a system for monitoring a section or a component of a line for the transport of hydrocarbons, for example a methane pipeline, installed in a hazard and/or limited access site, which comprises:

means for detecting deformation of the section of the line or component in its installation place;

a computerized central unit, provided with an interface for the above mentioned means for detecting deformation and connected thereto so as to receive data about the state of the section of the line or component, and in particular about its possible deformations;

means for remote transmission of data, connected to said computerized central unit and a remote communication line in order to transmit the above mentioned data, possibly processed, to one or more operating central stations or remote users authorized to control the methane pipeline;

a stand-alone solar electric generator, connected to the means for detecting deformation, to the central unit and to the means for remote transmission, and aimed at providing them with power needed for their operation.

BRIEF DESCRIPTION OF THE DRAWINGS

The distinguishing features of the invention will become apparent from the following description of preferred embodiments of the system for monitoring a section or a component of a line for the transport of hydrocarbons, according to the contents of claims and with the help of the enclosed drawings, in which:

DESCRIPTION OF PREFERRED EMBODIMENTS OF THE INVENTION

Figure 1:
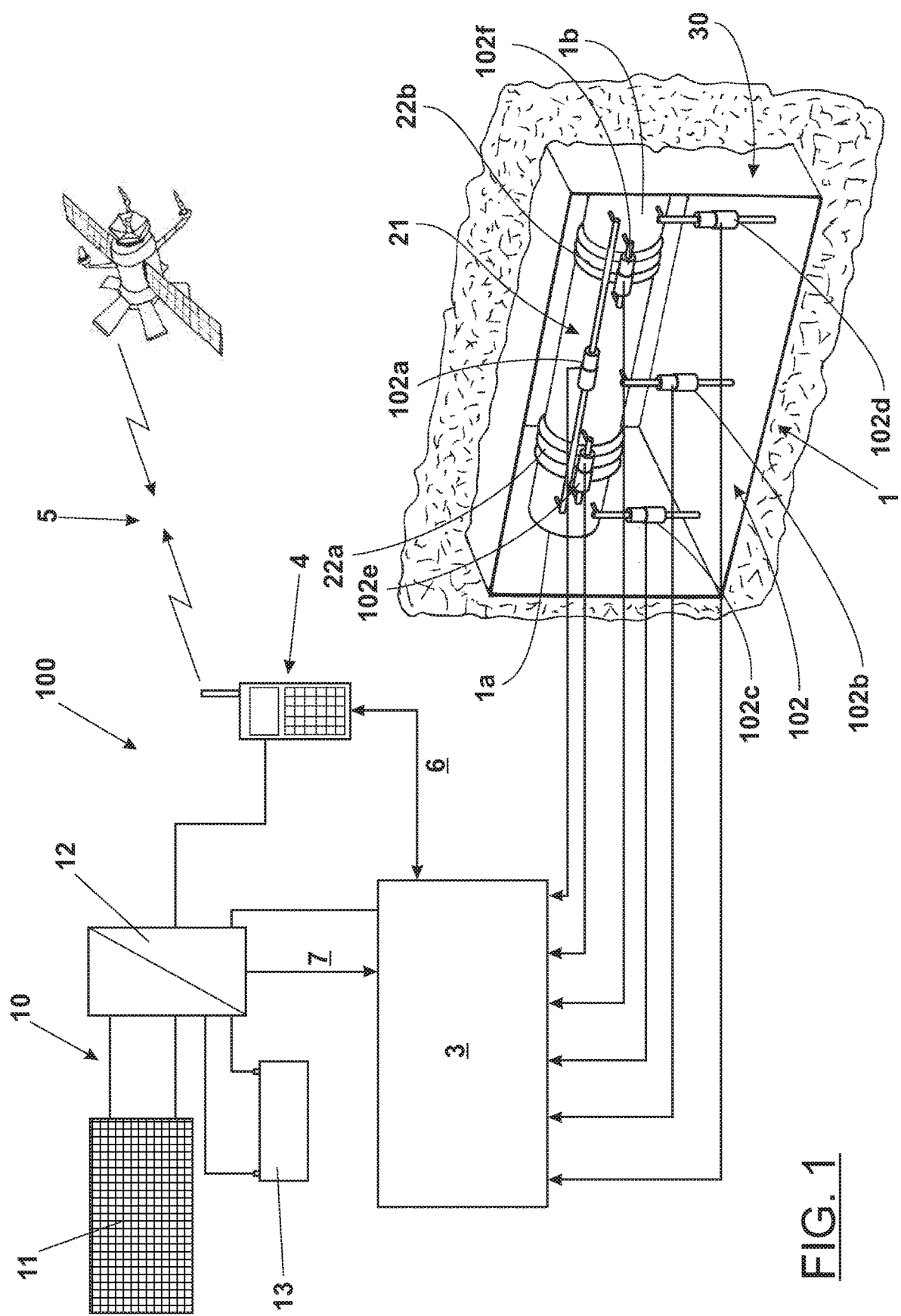
FIG. 1 is a schematic view, partially in blocks, of a configuration of a preferred embodiment of the system for monitoring a section of a line for the transport of hydrocarbons.

In the above mentioned figures, reference numeral 100 indicates a system for monitoring a section 1 or a component of a line for the transport of hydrocarbons, and in particular a methane pipeline, obtained according to the present invention.

Figure 3:
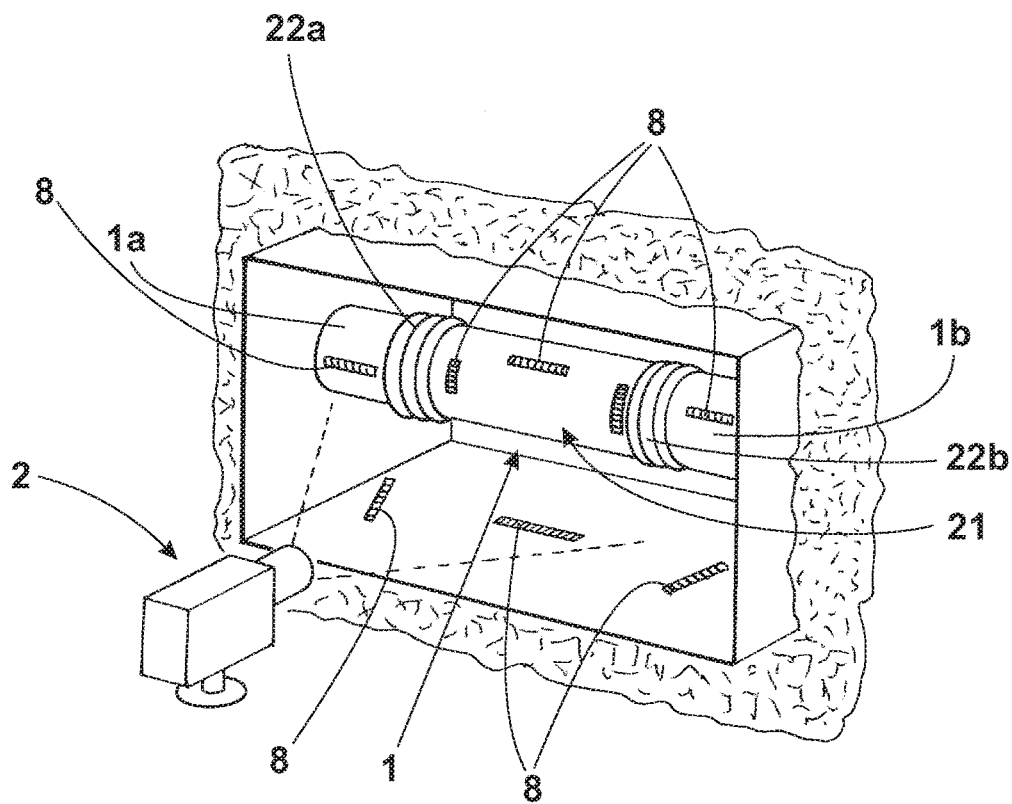
FIG. 3 is a schematic view of the arrangement of elements indicating position reference, provided in an alternative embodiment of the monitoring system.
Figure 4:
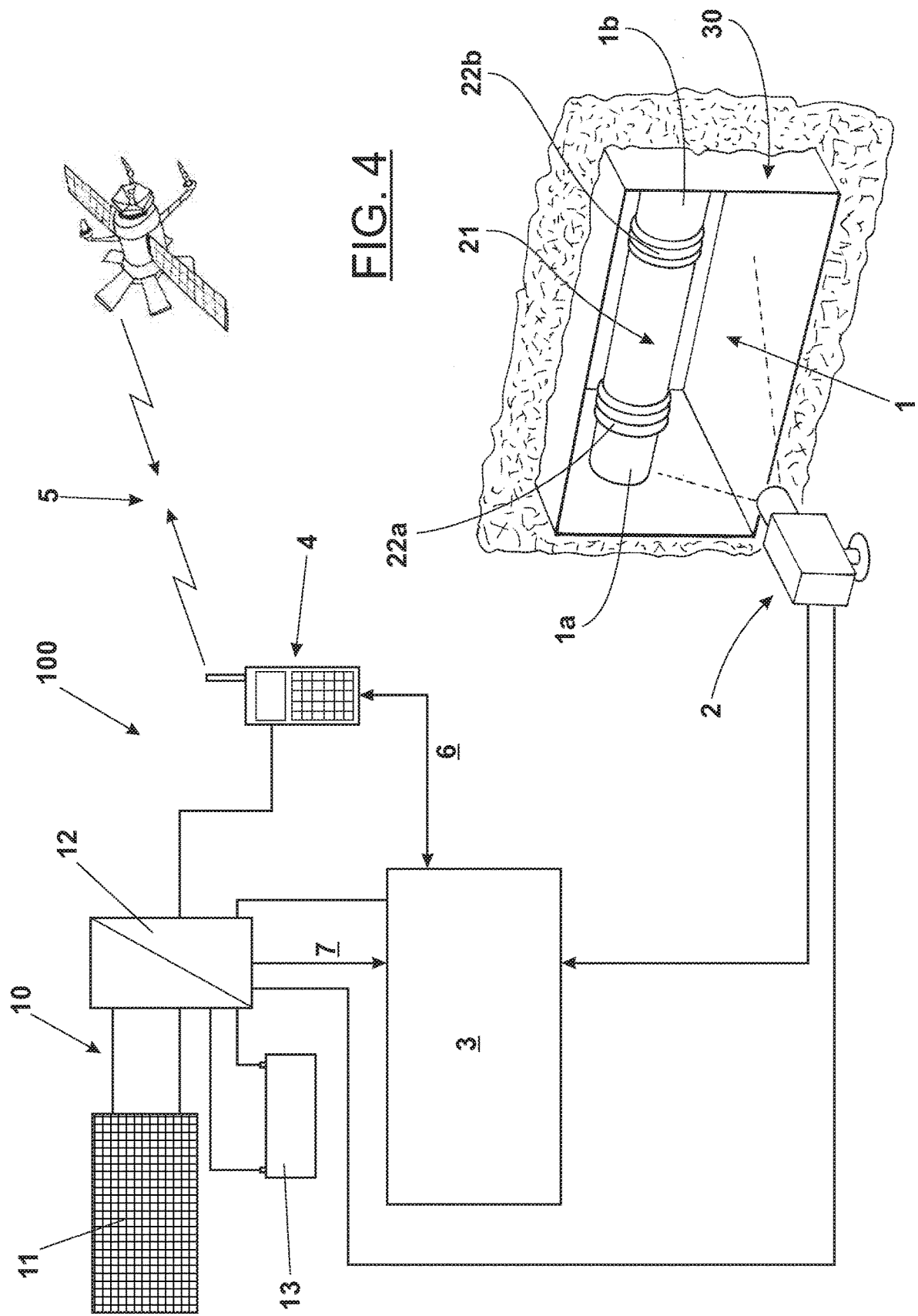
FIG. 4 is a schematic view of a basic embodiment of the invention.

The section 1 or component of the methane pipeline to be monitored is generally installed in a site having serious problems, potentially dangerous for the integrity of the section 1 or the component, and thus for the operation of the whole conveying line. Moreover, the section 1 or component is usually installed inside a building or room, for example a closed cabin, often underground or in the basement. For example, FIGS. 1, 3 and 4 illustrates a closed structure 30, showing a portion containing the line section 1. It is however understood that the installation site may be different, and that its structure is not relevant to the invention.

For example, the installation site can be part of a hilly or mountainous territory, subject to landslides and landslips, and therefore unstable. Since the section 1 of a methane pipeline or a component thereof is anchored to the surface, or even underground, it is clear that any, even moderate movement of the ground, which affects the site, can create stresses that could cause deformations or breakages in the system.

In particular, the section 1 of the line may be a special segment with elastic connection, provided to undergo extensions and contractions in response to stresses received from the portion of line on which it is installed due to moderate displacements of the surrounding soil. By way of not exhaustive example in the following description, reference will be made to the invention applied to one of these special segments, which comprises an interconnection joint 21, inserted in an interruption of line section 1 for connecting two sections 1a, 1b thereof, with the interposition of two elastic bellows like elements 22a, 22b. These elastic elements 22a, 22b are designed to follow possible slight deformations of the section 1 of the line without interrupting its continuity, and therefore without interrupting its functionality. It is clear, however, that the occurrence of moderate deformations, even if absorbed by the elastic connection segment 21, may indicate subsequent serious problems, and therefore be taken into consideration during planning of interventions destined to contain the deformations and make the methane pipeline safe.

Still by way of not exhaustive example, sometimes the components of a pipeline can be installed inside structures which, besides being subject to the situations described above, may be subject to periodic flooding or may even be permanently submerged.

Moreover, the sites in question are often situated in poorly anthropized areas, inaccessible and difficult to reach, so that even a direct monitoring with maintenance teams becomes complicated and expensive.

For these reasons, it is essential to identify with the utmost urgency the occurrence of anomalies at hazard sites, to minimize the damage and inconvenience in case of a sudden event that damages the section or component 1 of the methane pipeline, and it is also extremely important to detect and identify immediately those warning signals of such events that often occur at the installation sites. For example, small local landslips, cracks or others that, while not yet creating damage to the plants, predict a more significant landslide, or the presence of moderate amounts of water in a site subject to flooding.

The monitoring system 100 according to the invention is intended to be installed in such hazard sites, is able to operate in a completely self-sufficient way, and can be programmed in such a way as to combine maximum monitoring efficiency with the electricity and communication channels available in the site.

In the following, for sake of explanation simplicity, the structure of the system 100 will be described with reference to the monitoring of a section 1 of a methane pipeline. However, it is understood that the same structure of the system can be applied without distinction also to other components of a line for the transport of methane or other hydrocarbons, such as for example pumping stations, shut-off valves, reduction units etc.

In a preferred embodiment of the invention, (see FIG. 1) the monitoring system 100 comprises means for detecting deformation 102 made up of a plurality of strain gauges, mounted between different points of the section 1 of the line, or between important points of the section of the line 1 and the ground, or in any case between these points and reference points disconnected from the section of the line, for example the walls of the structure 30. The number and arrangement of the strain gauges may also vary, however without departing from the scope of the invention.

Strain gauges are known and commercially available devices. They are generally made up of two elements axially sliding with respect to each other, and comprise a transducer, which converts the sliding into an electrical signal, and an output interface, adapted to make the obtained electrical signal available to an external user.

According to an exemplary embodiment of the invention illustrated in FIG. 1, there are six strain gauges: a first strain gauge 102a, mounted between the aforesaid pieces of the line 1a, 1b and intended to detect the relative displacements of the two mentioned pieces; a second 102*b*, a third 102*c* and a fourth 102*d* strain gauge, mounted between the interconnection joint 21 and the ground, and between the pieces 1*a*, 1*b* and the ground, respectively; a fifth strain gauge 102*e* and a sixth strain gauge 102*e* mounted between the interconnection joint 21 and the two pieces 1*a*, 1*b*, bypassing the relative elastic elements 22*a*, 22*b*.

The above described and illustrated configuration of strain gauges is to be considered a not exhaustive example of the monitoring possibilities provided by the present system 100. Different configurations, comprising only a part of the strain gauges described above, or other differently arranged strain gauges, can be obtained without departing from the scope of the invention.

The strain gauges 102*a* . . . 102*f* are connected, via their output interface, to compatible input channels of a computerized central unit 3, provided with a special commercial, wired or wireless interface (for example with "Bluetooth", "Direct Wireless" or other equivalent technology). The central unit 3 is installed in a suitable container, depending on the characteristics of the site (if it is open and exposed to bad weather, or closed or otherwise protected), and provides a computer program for managing the operations of the monitoring system, according to what will be better specified below.

In a different embodiment, schematically illustrated in FIG. 4, the monitoring system 100 comprises means for detecting deformation consisting of a digital image recording or video recording video camera 2, and provided with a suitable wired or wireless interface in order to send the aforementioned images or filming according to suitable encodings. The video camera 2 is positioned near the section 1 of the methane pipeline, so as to frame at least a significant part thereof.

The video camera 2 is connected to the central computerized unit 3, obviously provided with a suitable commercial, wired or wireless interface (also in this case, for example, with "Bluetooth", "Direct Wireless" or other equivalent technology).

The central management unit 3 has also, connected thereto, means for remote transmission of data 4, intended to put the monitoring system 100 in communication with a remote operative central unit, or with other subjects authorized to monitor the pipeline, to transmit information about the state of the monitored section 1, such as data received from the strain gauges 102*a* . . . 102*f*, or images or filming received from the video camera 2, and possibly to receive commands or updates. The means for remote transmission 4 are suitably selected among those available and more appropriate for the site; for example, in the case of a site covered by a "3G" or "4G" cellular data network, the most advantageous connection will be a common Internet connection, while in the absence of such coverage the most suitable connection can be a data connection on the network satellite phone. In any case, these technologies are known and normally available, and therefore will not be further described in detail.

The central unit 3 however provides another interface 6 and the related software procedures for connection with the aforesaid remote transmission means 4.

In the preferred embodiment of the means for detecting deformation 102, the computer program operating in the central unit 3 is provided with procedures for acquiring and storing the data coming from the strain gauges. There are also procedures for sending such data, as received, to the remote operative central unit or other authorized entity or to process them, before sending, in order to detect significant differences from previous readings or exceeding values of a threshold of predetermined attention.

The computer program operating in the central unit 3 is provided with procedures for acquiring and storing the images or filming coming from the video camera 2, encoding and sending them, continuously or periodically, to the remote operative central unit or to another authorized subject.

In order to make the monitoring system 100 completely self-sufficient, which is an important aspect of the invention, the monitoring system 100 comprises also a stand-alone solar electric generator 10, electrically connected to the central unit 3, to the video camera 2, directly or by means of the aforementioned central unit 3, and to the means for remote transmission 4, to provide the power supply necessary for their operation.

Figure 2:
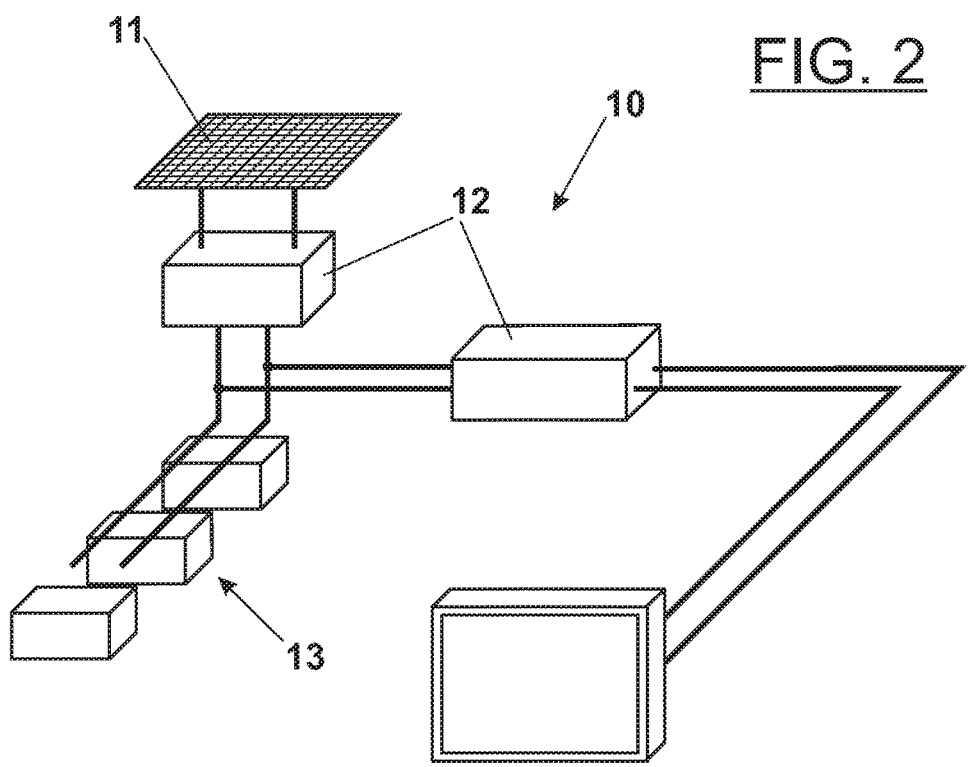
FIG. 2 is a schematic, but more detailed view of the stand-alone electric generator of FIG. 1.

In an advantageous embodiment, illustrated in FIG. 2, the electric generator 10 comprises one or more photovoltaic panels 11, a power converter device 12 according to the specifications provided for the aforementioned video camera 2, a central unit 3 and means for remote transmission 4, and a set 13 of rechargeable accumulators for storing electric charge in the periods of overproduction of photovoltaic panels, to be delivered in periods of insufficient production. The components of the electric generator 10 are dimensioned in such a way as to ensure sufficient energy availability for the normal operation of the monitoring system.

In any case, the energy converter device 12 advantageously comprises a data connection 7 with the central unit 3 (of a commercial type, for example via a local network or USB interface), to transmit data and information about the charge status of the accumulators and, if necessary, the current energy production of photovoltaic panels 11. For this purpose, the management program operating in the central unit 3 is appropriately provided with a procedure for receiving such information, and any modification of the operation of the system in case of low availability of energy. For example, this procedure may decide to periodically interrupt the activity of the video camera 2 and/or means for remote transmission 4, and to reactivate them periodically to communicate possible changes in the status of the monitored section 1.

If the installation site is a submerged site, or otherwise subject to undesirable flooding, the video camera 2 may be a waterproof or underwater video camera.

In one version, not shown as immediately comprehensible, the video camera 2 can also be installed on a motorized support, controllable by the central unit 3 by means of a suitable interface. In this case, the management program includes a further procedure for controlling the motor means of the video camera 2, in order to modify its filming position and therefore to extend the monitoring area.

The section 1 of the pipeline (or other component) of the monitored methane pipeline, located for example in a site subject to landslides, even before an important and damaging event occurs, such as a large landslip that produces breakages or unwanted displacements, may be subject to minor and more gradual stresses, for example caused by small displacements of the ground, precursory of a subsequent major landslip. In this case, the section 1 of the pipeline may undergo small displacements or deformations, which are not actually harmful, but which, if identified, may suggest urgent interventions of precautionary consolidation of the area, and therefore avoid subsequent problems. Such small displacements or deformations, as well as small displacements of the surrounding terrain, may not be appreciated by the monitoring personnel following a simple visual evaluation of the images, or filming received by the monitoring system 100 as described above.

For this purpose, according to a further embodiment, the monitoring system 100 (see FIG. 3), obtained as an evolution of the aforementioned basic embodiment, further comprises a plurality of indicator elements 8, identifiable by the video camera 2, intended to define precise positions of the section 1 or component of the methane pipeline or of the surrounding terrain or structure. These indicator elements 8 are fixed in known and predefined positions with respect to the section 1 or component, or to the surrounding ground or article.

By way of example, the indicator elements 8 may consist of linear rods or plates, possibly graduated with the engraving of recognition marks. The linear rods or plates are advantageously mounted along non-aligned reference axes, and preferably along three reference axes.

The central unit 3 includes also an identification and analysis procedure, provided with software for identifying the exact position of all the indicator elements 8 in successive images or frames of the filming received by the video camera 2 and comparing the references of these positions to check their possible, even minimal, movements.

In this way, the monitoring system 100 can not only send images or filming to the operative central unit and/or to subjects authorized to monitor the images and filming, but it can also report possible anomalies deriving from moderate displacements of the indicator elements, and therefore to moderate deformations of the monitored section 1 of the pipeline or the monitored component, or of the surrounding soil or the construction.

In a variant of this embodiment, the monitoring system 100 can only transmit data and information on the remote communication line when these anomalies occur. The data and information may consist only of the numerical data relating to the aforementioned anomalies, in the images or filming that show the anomalies, or both types of information.

The advantages offered by the above described monitoring system derive first of all from the fact that it makes available, in a simple and reliable way, the always up-to-date status of a risk section of a line for the transport of hydrocarbons, or of important components thereof, which would otherwise be impossible or extremely difficult and expensive to get.

Another advantage of the invention derives from proposing a monitoring system capable of supplying early warning information about potentially critical situations for the section or the component of the monitored transport line, to one or more subjects responsible for the maintenance and conservation of a transport line.

It is understood that what has been described above, is illustrative and not limiting, therefore, possible variants of details, which could become necessary because of technical and/or functional reasons, are considered from now on within the same protective scope defined by the claims below.

The invention claimed is:

1. A system for monitoring a section or a component of a transport line for hydrocarbons, situated in a hazard and/or limited access site, including: means for detecting deformation (102, 2) of said section (1) of the line or component in an installation area; a computerized central unit (3) provided with an interface for said means for detecting deformation (102,2) and connected thereto to receive data about the deformation of said section (1) of the line or component; means for remote transmission of data (4) connected to said computerized central unit (3) and a remote communication line (5) to transmit said images or filming to one or more operating stations or remote users authorized to monitor said line for the transport of hydrocarbons; a stand-alone solar electric generator (10), connected to said means for detecting deformation (102,2), central unit (3) and means for remote transmission (4), aimed at providing them with power needed for their operation, wherein said section (1) of the line includes pieces (1a, 1b) connected to one another by means of at least one interconnection junction (21), mounted n a region of an interruption of said section (1) with interposition of elastic elements (22a, 22b).

2. The system according to claim 1, wherein said means for detecting deformation (102) include a plurality of strain gauges (102a,102b,102c,102d,102e,102f), mounted between different positions of said section (1) of the line or component and/or between thereto and a fixed reference.

3. The system according to claim 2, wherein one or more strain gauges are provided, selected from the following: a first strain gauge (102a), mounted between said pieces (1a,1b); a second (102b), a third (102c) and a fourth (102d) strain gauge, mounted between said interconnection junction (21) and a ground as well as between the pieces (1a,1b) of said section (1) of the line connected to the junction, respectively; fifth (102e) and sixth (102f) strain gauges mounted between said pieces (1a,1b) and said interconnection junction (21) respectively, bypassing said elastic elements (22a,22b).

4. The system according to claim 1, wherein said remote communication line (5) consists of a cellular network for voice and data transmission, and in that said means for remote transmission of data (4) include a data transmission device, that operates over said cellular network, and an interface (6), interposed between said data transmission device (4) and computerized central unit (3).

5. The system according to claim 1, wherein said remote communication line (5) consists of a satellite telephone connection, and in that said means for remote transmission of data (4) include a satellite transmission/reception device and a connection and encoding interface (6) placed between said satellite transmission/reception device and computerized central unit.

6. The system according to claim 1, wherein said electric generator (10) comprises one or more photovoltaic panels (11), a power converter device (12) that meets the specifications required by said video camera (2), central unit (3) and means for remote transmission (4), and a battery of rechargeable accumulators (13).

7. The system according to claim 1, wherein said means for detecting deformation include at least one video camera (2), installed so as to view said hazard and/or limited access site and adapted to frame and film said section (1) of the line or component in the installation area.

8. The system according to claim 7, wherein an activating procedure for computer program is provided in said central unit (3) for receiving orders from a central operating unit and operating motor means that are coupled to said video camera (2) to change the filming position according to said orders.

9. The system according to claim 7, where a timing procedure for a computer program is provided in said central unit to define timing of the monitoring operations, to switch off and on and operate said video camera (2) at preset time intervals.

10. The system according to claim 7, further comprising: a plurality of indicator elements (8) which are fastened to said section (1) of the line or component, and/or to a ground or surrounding structure in fixed and preset positions, and in that procedure for recognition and analysis is provided in said central unit (3), equipped with means for identifying said indicator elements (8) in the images or filming sent by said video camera (2), identifying their position and comparing said position in images or frames subsequent in time, in order to detect even minimum displacements of at least one of said indicator elements (8), and with means for defining and sending alarm messages to said operating stations and/or said remote users.

11. The system according to claim 10, wherein said indicator elements (8) include graduated rods or plates, mounted along position reference axes, which are not aligned with one another.

\* \* \* \* \*